(12) United States Patent
Kim et al.

(10) Patent No.: US 10,651,772 B2
(45) Date of Patent: May 12, 2020

(54) INVERTER SYSTEM FOR VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Beom Sik Kim, Gwangmyeong-Si (KR); Jin Hwan Jung, Suwon-Si (KR); Ki Young Jang, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/142,594

(22) Filed: Sep. 26, 2018

(65) Prior Publication Data

US 2019/0319571 A1 Oct. 17, 2019

(30) Foreign Application Priority Data

Apr. 13, 2018 (KR) .................. 10-2018-0043154

(51) Int. Cl.
*H02P 1/00* (2006.01)
*H02P 27/06* (2006.01)
(Continued)

(52) U.S. Cl.
CPC .............. *H02P 27/06* (2013.01); *B60L 50/51* (2019.02); *H02M 1/088* (2013.01); *B60L 2210/40* (2013.01); *H02M 2001/0048* (2013.01)

(58) Field of Classification Search
CPC .. H02P 29/60; H02P 29/027; B60L 2240/525; B60L 3/00
See application file for complete search history.

(56) References Cited

U.S. PATENT DOCUMENTS

| 5,414,339 A | 5/1995 | Masaki et al. |
| 7,071,639 B2 | 7/2006 | Ochiai et al. |

(Continued)

FOREIGN PATENT DOCUMENTS

| JP | 5104258 B2 | 12/2012 |
| JP | 5851267 B2 | 2/2016 |
| KR | 10-2011-0105034 A | 9/2011 |

OTHER PUBLICATIONS

Extended European Search Report dated Jul. 1, 2019 issued in European Patent Application No. 19169445.4.

(Continued)

*Primary Examiner* — Karen Masih
(74) *Attorney, Agent, or Firm* — Morgan, Lewis & Bockius LLP

(57) ABSTRACT

An inverter system for vehicles according to the present disclosure may include: an energy storage storing electrical energy; a first inverter which includes a plurality of first switches and converts the energy stored in the energy storage into AC power; a second inverter which includes a plurality of second switches, which are different from the first switches, is connected in parallel with the first inverter to the energy storage and converts the energy stored in the energy storage into AC power; a motor driven by receiving the AC power converted through the first inverter and the second inverter; and a controller for controlling operations of the first inverter and the second inverter based on power requirements of the motor.

11 Claims, 4 Drawing Sheets

(51) Int. Cl.
 *H02M 1/088* (2006.01)
 *B60L 50/51* (2019.01)
 *H02M 1/00* (2006.01)

(56) References Cited

U.S. PATENT DOCUMENTS

| | | |
|---|---|---|
| 7,099,756 B2 | 8/2006 | Sato |
| 7,277,304 B2 | 10/2007 | Stancu et al. |
| 8,193,743 B2 | 6/2012 | Yamada et al. |
| 9,024,563 B2 | 5/2015 | Bunte et al. |
| 9,692,342 B2 | 6/2017 | Kano et al. |
| 9,834,098 B2 | 12/2017 | King et al. |
| 9,853,570 B2 | 12/2017 | Maly |
| 9,917,543 B1 | 3/2018 | Sarlioglu et al. |
| 10,348,222 B2 | 7/2019 | Dutta et al. |
| 10,411,532 B2 | 9/2019 | Lee et al. |
| 2004/0262057 A1 | 12/2004 | Kumar |
| 2005/0082096 A1* | 4/2005 | Oono ................ B60K 6/445 180/65.235 |
| 2010/0013438 A1 | 1/2010 | Anwar et al. |
| 2015/0043254 A1 | 2/2015 | Preckwinkel et al. |
| 2015/0117073 A1* | 4/2015 | Flett .................. H02M 5/4585 363/37 |
| 2017/0250623 A1 | 8/2017 | Maly |
| 2019/0006979 A1 | 1/2019 | Suzuki et al. |

OTHER PUBLICATIONS

U.S. Non-Final Office Action dated Sep. 5, 2019 issued in U.S. Appl. No. 16/132,828.
U.S. Non-Final Office Action dated Sep. 17, 2019 issued in U.S. Appl. No. 16/182,846.
U.S. Notice of Allowance dated Jan. 22, 2020 issued in U.S. Appl. No. 16/182,846.
U.S. Notice of Allowance dated Feb. 24, 2020 issued in U.S. Appl. No. 16/132,828.
U.S. Non-Final Office Action dated Mar. 11, 2020 issued in U.S. Appl. No. 16/389,450.

* cited by examiner

-PRIOR ART-

[FIG. 4]
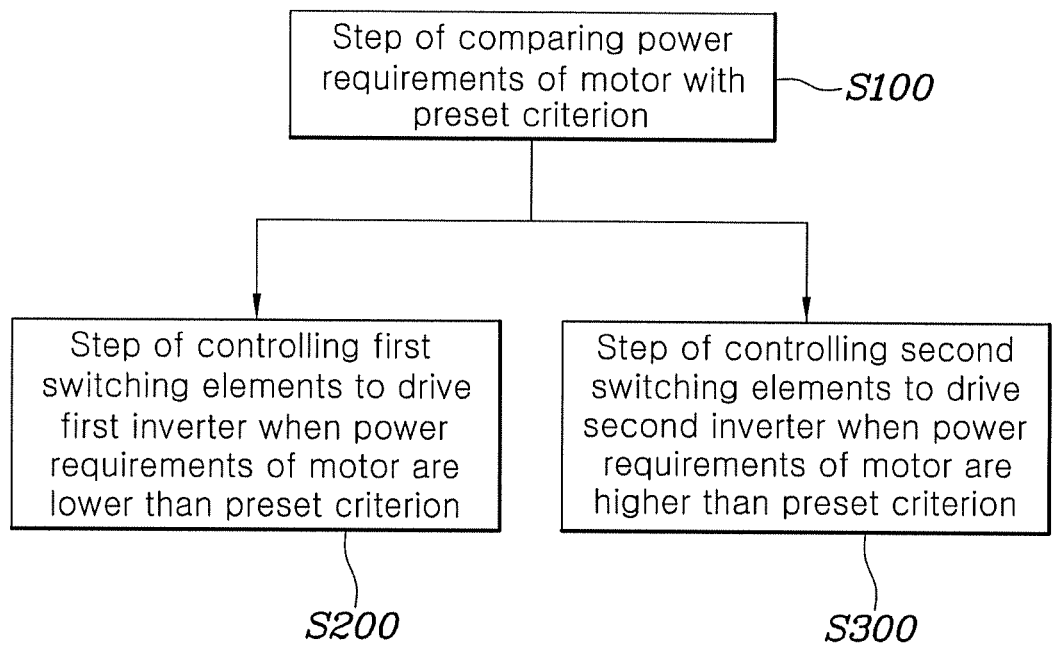

INVERTER SYSTEM FOR VEHICLE AND CONTROL METHOD THEREOF

CROSS REFERENCE TO RELATED APPLICATION

The present application claims priority to Korean Patent Application No. 10-2018-0043154, filed Apr. 13, 2018, the entire contents of which is incorporated herein for all purposes by this reference.

TECHNICAL FIELD

The present disclosure relates to an inverter system for vehicles and a control method thereof, and more specifically, to an inverter system for a vehicle and a control method thereof which can improve efficiency and power of the vehicle by driving different inverters on the basis of power requirements of the vehicle.

BACKGROUND

Recently, technologies with respect to green vehicles using electrical energy as vehicle power have been actively developed to cope with air pollution and depletion of fossil fuel reserves. Green vehicles include a hybrid electric vehicle, a fuel cell electric vehicle, and an electric vehicle.

In a conventional inverter system for a vehicle for outputting high power, as shown in FIG. 1, multiple switching elements S1 to S6 are connected in parallel to drive a motor in order to output high power. However, in the conventional inverter system, excessive switching and conducting losses occur in the switching elements in a fuel economy driving mode in which power requirements of the motor are relatively low, decreasing vehicle fuel efficiency although high power can be output by connecting the switching elements in parallel. Accordingly, development of an inverter system for vehicles which is able to improve the efficiency as well as power of a vehicle is required.

SUMMARY

The present disclosure is devised to solve the problems with the related art described above, and an object of the present disclosure is to provide an inverter system for vehicles and a control method thereof which can improve the efficiency and power of a vehicle by selectively driving a first inverter and a second inverter on the basis of power requirements of a motor.

To accomplish the object, an inverter system for vehicles according to one exemplary embodiment of the present disclosure may include: an energy storage storing electrical energy; a first inverter including a plurality of first switches and converting the energy stored in the energy storage into AC power; a second inverter including a plurality of second switches, which are different from the first switches, and converting the energy stored in the energy storage into AC power, the second inverter being connected in parallel with the first inverter to the energy storage; a motor driven by receiving the AC power converted through the first inverter and the second inverter; and a controller for controlling operations of the first inverter and the second inverter on the basis of power requirements of the motor.

The first switches may be SiC-FETs (silicon carbide field effect transistors) and the second switches may be Si-IGBTs (silicon-insulated gate type bipolar transistors).

The controller may control the first switches to drive the first inverter when the power requirements of the motor are lower than a preset power value.

The controller may control the second switches to drive the second inverter when the power requirements of the motor are higher than the preset power value.

The controller may control the first switches and the second switches to drive the first inverter and the second inverter when the power requirements of the motor are higher than the preset power value.

The first inverter may have less switching loss and conducting loss than the second inverter.

The first inverter may have a lower rated output for driving the motor than that of the second inverter.

The inverter system for vehicles may further include a temperature sensor for measuring the temperature of the second switches.

The controller may decrease gate voltages of the second switches when the temperature measured through the temperature sensor is equal to or higher than a preset temperature.

The motor may be a single motor driven by being selectively provided with power converted through the first inverter or power converted through the second inverter or simultaneously provided with the power converted through the first inverter and the power converted through the second inverter according to the power requirements of the motor.

The motor may include a first motor driven by being provided with power converted through the first inverter and a second motor driven by being provided with power converted through the second inverter.

To accomplish the object, a method of controlling an inverter system for vehicles according to another exemplary embodiment of the present disclosure may include: comparing, by a controller, power requirements of a motor with a preset power value; controlling, by the controller, first switches to drive a first inverter when the power requirements of the motor are lower than the preset power value; and controlling, by the controller, second switches to drive a second inverter when the power requirements of the motor are higher than the preset power value, by the controller, The method may further include decreasing gate voltages of the second switches when a temperature measured through a temperature sensor for measuring the temperature of the second switches is equal to or higher than a preset temperature.

According to the inverter system for vehicles and the control method thereof according to the present disclosure, it is possible to improve the efficiency and power of a vehicle by selectively driving the first inverter and the second inverter on the basis of power requirements of the motor.

In addition, it is possible to reduce the gate voltages of the second switches when the temperature of the second switches, measured through the temperature sensor, is equal to or higher than the predetermined temperature to prevent current concentration on the second switches.

BRIEF DESCRIPTION OF THE DRAWINGS

The above and other objects, features and other advantages of the present disclosure will be more clearly understood from the following detailed description taken in conjunction with the accompanying drawings, in which:

FIG. 4 is a flowchart of a method of controlling an inverter system for vehicles according to the present disclosure.

DETAILED DESCRIPTION

Hereinafter, an inverter conversion system for vehicles and a control method thereof according to preferred embodiments of the present disclosure will be described with reference to the attached drawings.

Figure 1:
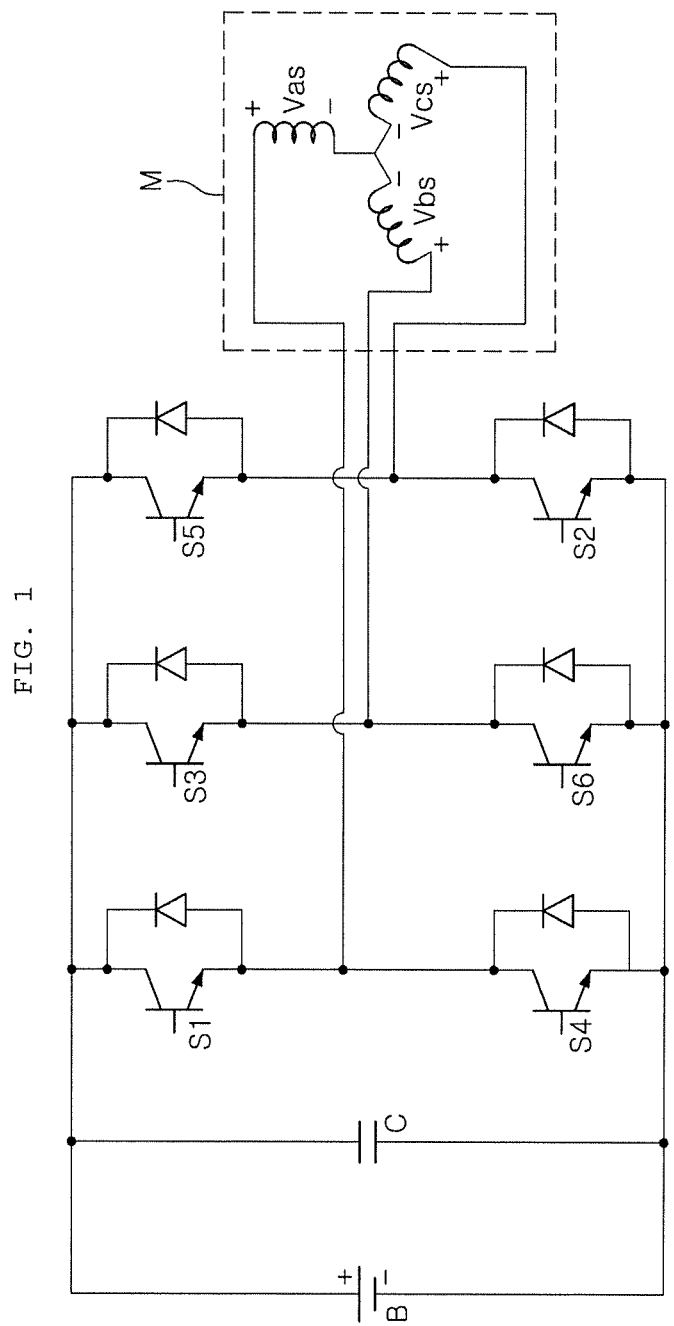
FIG. 1 is a diagram showing a conventional inverter system.
Figure 2:
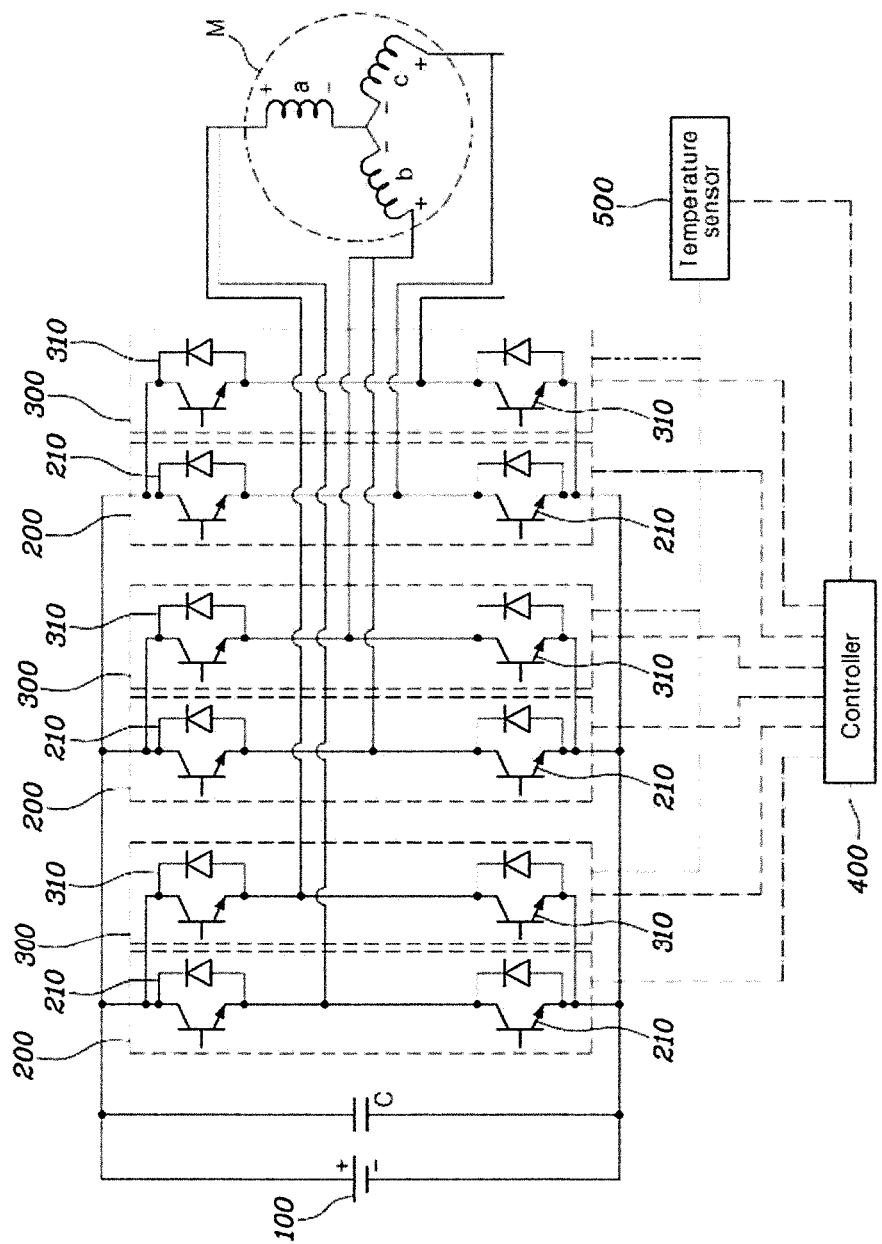
FIG. 2 is a diagram showing an inverter system according to an embodiment of the present disclosure.

As shown in FIG. 2, an inverter system for vehicles according to the present disclosure may include an energy storage 100, a first inverter 200, a second inverter 300, a motor M, a controller 400, and a temperature sensor 500. A detailed configuration of the inverter system for vehicles according to the present disclosure will be described in more detail.

The energy storage 100 stores electrical energy and serves to provide electrical energy for driving the motor M. The energy storage 100 may be a battery which stores and supplies electrical energy for driving a motor of a vehicle according to an embodiment. However, the battery is an example and various devices including a super capacitor may be used as the energy storage so long as they can store and provide electrical energy for driving a motor of a vehicle.

The first inverter 200 includes a plurality of first switches 210 and serves to convert the energy stored in the energy storage 100 into AC power. Here, the plurality of first switches 210 may be connected in parallel and output terminals thereof may be respectively connected to phases of the motor M, as shown in FIG. 2.

In addition, the first switches 210 in the first inverter 200 may be turned on/off by the controller 400 which will be described later to convert DC power provided from the energy storage 100 into AC power. Conversion of DC power into AC power through an inverter is a known technology and detailed description thereof is thus omitted.

The first switches 210 may be SiC-FETs (silicon carbide field effect transistors). SiC-FETs are used as the first switching elements in the present disclosure because SiC-FET has lower switching loss and conducting loss with respect to a low load than Si-IGBT. That is, when power requirements of the motor are low, it is possible to reduce switching loss and conducting loss by driving the motor M through the first inverter 200 including the SiC-FETs, thereby improving the fuel efficiency of the vehicle.

The first inverter 200 composed of the first switches 210 may have less switching loss and conductive loss than the second inverter 300 which will be described later. Further, the first inverter 200 may have a lower rated output for driving the motor than that of the second inverter 300.

The second inverter 300 includes a plurality of second switches 310 of a different type from the first switches 210 and serves to convert the energy stored in the energy storage 100 into AC power. Here, the plurality of second switches 310 may be connected in parallel and output terminals thereof may be respectively connected to the phases of the motor M, as shown in FIG. 2. Further, the second inverter 300 may be connected in parallel with the first inverter 200 to the energy storage 100.

In addition, the second switches 310 in the second inverter 300 may be turned on/off by the controller 400 which will be described later to convert DC power provided from the energy storage 100 into AC power. Conversion of DC power into AC power through an inverter is a known technology and detailed description thereof is thus omitted.

The second switches 310 may be Si-IGBTs (silicon-insulated gate type bipolar transistors). In the present disclosure, Si-IGBTs which are second switches 310 are connected in parallel and the motor M is driven through the second inverter 300 including the Si-IGBTs even in a high power mode in which power requirements of the motor are high, to output high power.

The motor M may be driven by AC power converted through the first inverter 200 and the second inverter 300. That is, the motor M may be driven by power provided through the first inverter 200 and the second inverter 300 to drive the vehicle.

The controller 400 may control the operations of the first inverter 200 and the second inverter 300 on the basis of the power requirements of the motor M. Here, the power requirements of the motor M may be power requirements of a corresponding vehicle. In other words, the controller 400 may selectively drive the first inverter 200 and the second inverter 300 in a fuel economy driving mode in which power requirements of the vehicle are relatively low and in a sports mode or a high power mode in which power requirements of the vehicle are relatively high.

More specifically, the controller 400 may control the first switches 210 to drive the first inverter 200 when the power requirements of the motor M are lower than a preset power value, that is, in the fuel economy driving mode in which power requirements of the vehicle are relatively low. In other words, when the power requirements of the motor M are lower than the preset power value, the controller 400 may control electrical energy provided from the energy storage 100 to be converted into AC power through the first inverter 200 and delivered to the motor M, thereby reducing switching loss and conducting loss and thus improving the fuel economy of the vehicle.

In addition, the controller 400 may control the second switches 310 to drive the second inverter 300 when the power requirements of the motor M are higher than the preset power value, that is, in the sports mode or high power mode in which the power requirements of the vehicle are high. In other words, when the power requirements of the motor M are higher than the preset power value, the controller 400 may control electrical energy provided from the energy storage 100 to be converted into AC power through the second inverter 300 and delivered to the motor M, thereby outputting high power.

In the various embodiments of the present disclosure, the controller 400 is a hardware device and may be an electronic control unit (ECU).

Further, when the power requirements of the motor M are higher than the preset power value, that is, in the sports mode or high power mode in which the power requirements of the vehicle are high, the controller 400 may control the first switches 210 and the second switches 310 to drive the first inverter 200 and the second inverter 300. In other words, when the power requirements of the motor M are higher than the preset power value, the controller 400 may control electrical energy provided from the energy storage 100 to be converted into AC power through the first inverter 200 and the second inverter 300 and delivered to the motor M, thereby outputting high power.

The temperature sensor 500 serves to measure the temperature of the second switches 310. When the power requirements of the motor M are high, the resistance of the Si-IGBT which is the second switch 310 becomes lower than the resistance of the SiC-FET which is the first switch 210 to cause current concentration on the second switch 310, and thus the second switch 310 may be overheated. Accordingly, the temperature of the second switch 310 is measured using the temperature sensor 500 in order to check whether current concentration on the second switch 310 occurs.

In addition, the controller 400 may reduce the gate voltages of the second switches 310 when the temperature of the second switches 310 measured through the temperature sensor 500 is equal to or higher than a preset temperature. That is, the controller 400 may reduce the voltage applied to the gates of the second switches to prevent current concentration on the second switches 310 when the temperature of the second switches 310 measured through the temperature sensor 500 is equal to or higher than the preset temperature.

The motor M according to an embodiment of the present disclosure may be a single motor driven by being selectively provided with power converted through the first inverter 200 or power converted through the second inverter 300 or by being simultaneously provided with the power converted through the first inverter 200 and the power converted through the second inverter 300 on the basis of the power requirements of the motor, as shown in FIG. 2. Specifically, when the motor M is a 3-phase motor, as shown in FIG. 2, according to an embodiment, the output terminals of the first inverter 200 and the second inverter 300 may be commonly connected to the phases a, b and c of the motor M. In this case, the controller 400 may drive the first inverter 200 by controlling the first switches 210 to drive the motor M when the power requirements of the motor are lower than the preset power value. When the power requirements of the motor are higher than the preset power value, the controller 400 may drive the second inverter 300 by controlling the second switches 310 to drive the motor M or may simultaneously drive the first inverter 200 and the second inverter 300 by controlling the first switches 210 and the second switches 310 to drive the motor M.

Figure 3:
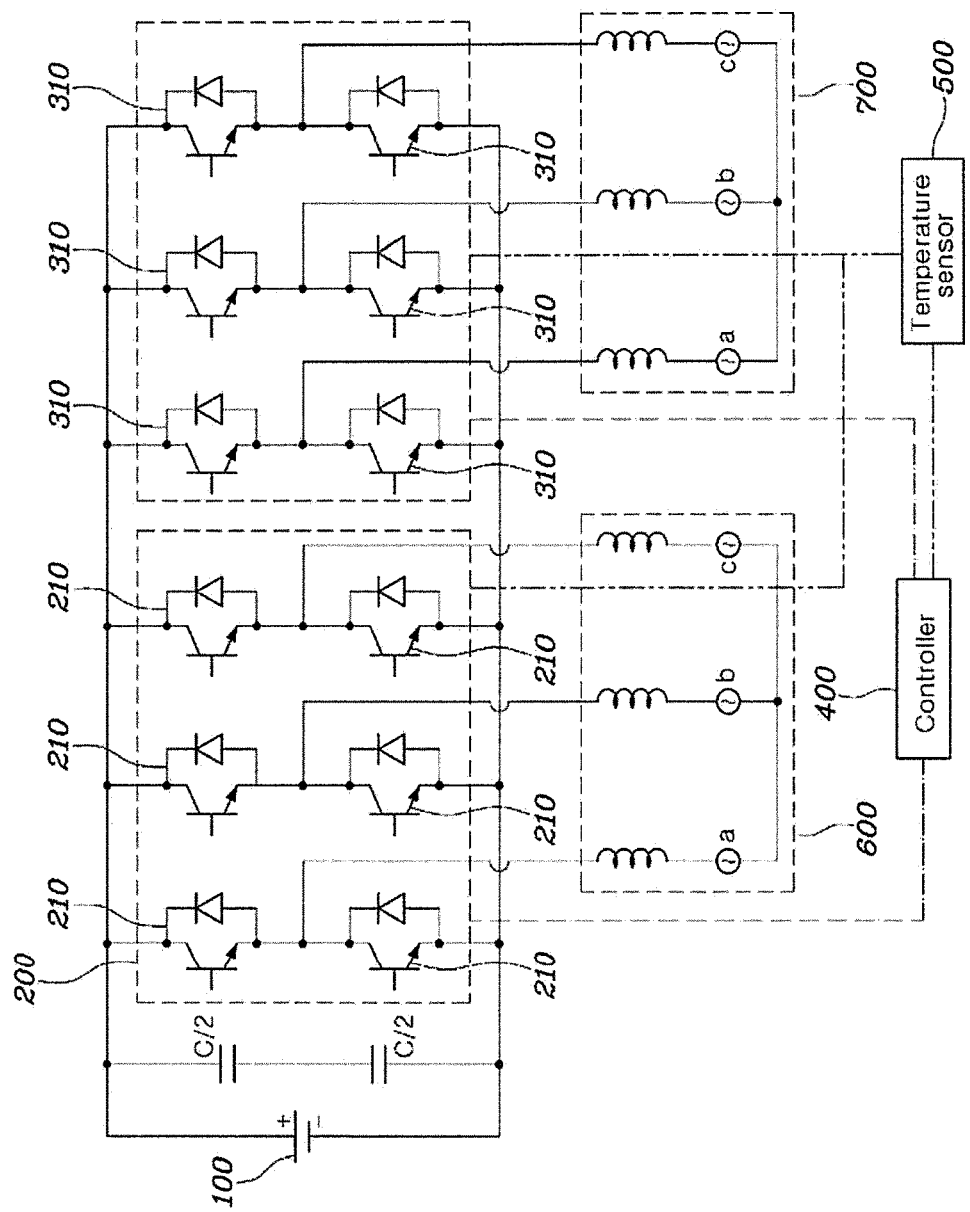
FIG. 3 is a diagram showing an inverter system according to another embodiment of the present disclosure.

Referring to FIG. 3, a motor according to another embodiment of the present disclosure may include a first motor 600 driven by being provided with power converted through the first inverter 200 and a second motor 700 driven by being provided with power converted through the second inverter 300. More specifically, when the motor includes the first motor 600 and the second motor 700, as shown in FIG. 3, the output terminals of the first inverter 200 may be respectively connected to the phases a, b and c of the first motor 600 and the output terminals of the second inverter 300 may be respectively connected to the phases a, b and c of the second motor 700. In this case, the controller 400 may drive the first inverter 200 by controlling the first switches 210 to drive the first motor 600 when the power requirements of the motor are lower than the preset power value. On the other hand, the controller 400 may drive the second inverter 300 by controlling the second switches 310 to drive the second motor 700 when the power requirements of the motor are higher than the preset power value.

In this manner, the inverter system for vehicles according to the present disclosure can selectively drive the first inverter and the second inverter on the basis of the power requirements of the motor to improve the efficiency and power of a vehicle.

Although not shown, the inverter system for vehicles according to the present disclosure may further include, between the energy storage 100 and the first and second inverters 200 and 300, a capacitor C connected in parallel with the energy storage 100, an input voltage sensor (not shown) for measuring a voltage applied from the energy storage 100 to the first inverter 200 and the second inverter 300, a voltage converter (not shown) for converting the voltage measured by the input voltage sensor and applying the converted voltage to the controller 400, an output current sensor (not shown) for measuring currents output from the first inverter 200 and the second inverter 300, and a current converter (not shown) for converting the currents measured by the output current sensor and applying the converted currents to the controller 400. Here, voltage information data input to the inverters, which is input through the voltage converter, and output current information data output from the inverters, which is input through the current converter, may be used for the controller 400 to control operation of each inverter.

FIG. 4 is a flowchart of a method of controlling the inverter system for vehicles according to the present disclosure. As shown in FIG. 4, the method of controlling the inverter system for vehicles according to the present disclosure may include: a step of comparing power requirements of the motor with a preset power value; a step of controlling the first switches to drive the first inverter when the power requirements of the motor are lower than the preset power value; and a step of controlling the second switches to drive the second inverter when the power requirements of the motor are higher than the preset power value. In addition, the method of controlling the inverter system for vehicles according to the present disclosure may further include a step of decreasing gate voltages of the second switches when a temperature of the second switches, measured through the temperature sensor, is equal to or higher than a preset temperature. Here, technical features with respect to the steps of the method of controlling the inverter system for vehicles are the same as the above-described features of the controller of the inverter system for vehicles, and detailed description thereof is thus omitted.

What is claimed is:

1. An inverter system for a vehicle, comprising:
an energy storage storing electrical energy;
a first inverter including a plurality of first switches and converting the energy stored in the energy storage into AC power;
a second inverter including a plurality of second switches, which are different from the first switches, the second inverter converting the energy stored in the energy storage into AC power, and connected in parallel with the first inverter to the energy storage;
a motor driven by AC power converted through the first inverter and the second inverter; and
a controller for controlling operations of the first inverter and the second inverter based on power requirements of the motor,
wherein the plurality of first switches are silicon carbide field effect transistors (SiC-FETs), and the plurality of second switches are silicon-insulated gate type bipolar transistors (Si-IGBTs), and
wherein the controller controls the plurality of first switches to drive the first inverter when the power requirements of the motor are lower than a preset power value.

2. The inverter system according to claim 1, wherein the controller controls the second switches to drive the second inverter when the power requirements of the motor are higher than the preset power value.

3. The inverter system according to claim 1, wherein the controller controls the first switches and the second switches together to drive the first inverter and the second inverter when the power requirements of the motor are higher than the preset power value.

4. The inverter system according to claim 1, wherein the first inverter has less switching loss and conducting loss than the second inverter.

5. The inverter system according to claim 1, wherein the first inverter has a lower rated output for driving the motor than that of the second inverter.

6. The inverter system according to claim 1, further comprising a temperature sensor for measuring a temperature of the plurality of the second switches.

7. The inverter system according to claim 6, wherein the controller decreases gate voltages of the second switches when the temperature measured through the temperature sensor is equal to or higher than a preset temperature.

8. The inverter system according to claim 1, wherein the motor is a single motor driven by selectively receiving power converted through the first inverter or power converted through the second inverter or simultaneously receiving the power converted through the first inverter and the power converted through the second inverter according to the power requirements of the motor.

9. The inverter system according to claim 1, wherein the motor includes a first motor driven by receiving power converted through the first inverter and a second motor driven by receiving power converted through the second inverter.

10. A method of controlling an inverter system for vehicles, comprising:
  comparing, by a controller, power requirements of a motor with a preset power value;
  controlling, by the controller, first switches to drive a first inverter when the power requirements of the motor are lower than the preset power value; and
  controlling, by the controller, second switches to drive a second inverter when the power requirements of the motor are higher than the preset power value.

11. The method according to claim 10, further comprising decreasing gate voltages of the second switches when a temperature measured through a temperature sensor for measuring a temperature of each of the second switches is equal to or higher than a preset temperature.

* * * * *